Feb. 21, 1939.   L. F. HUNT   2,147,841
PROTECTIVE SYSTEM
Filed Nov. 30, 1936   5 Sheets-Sheet 5
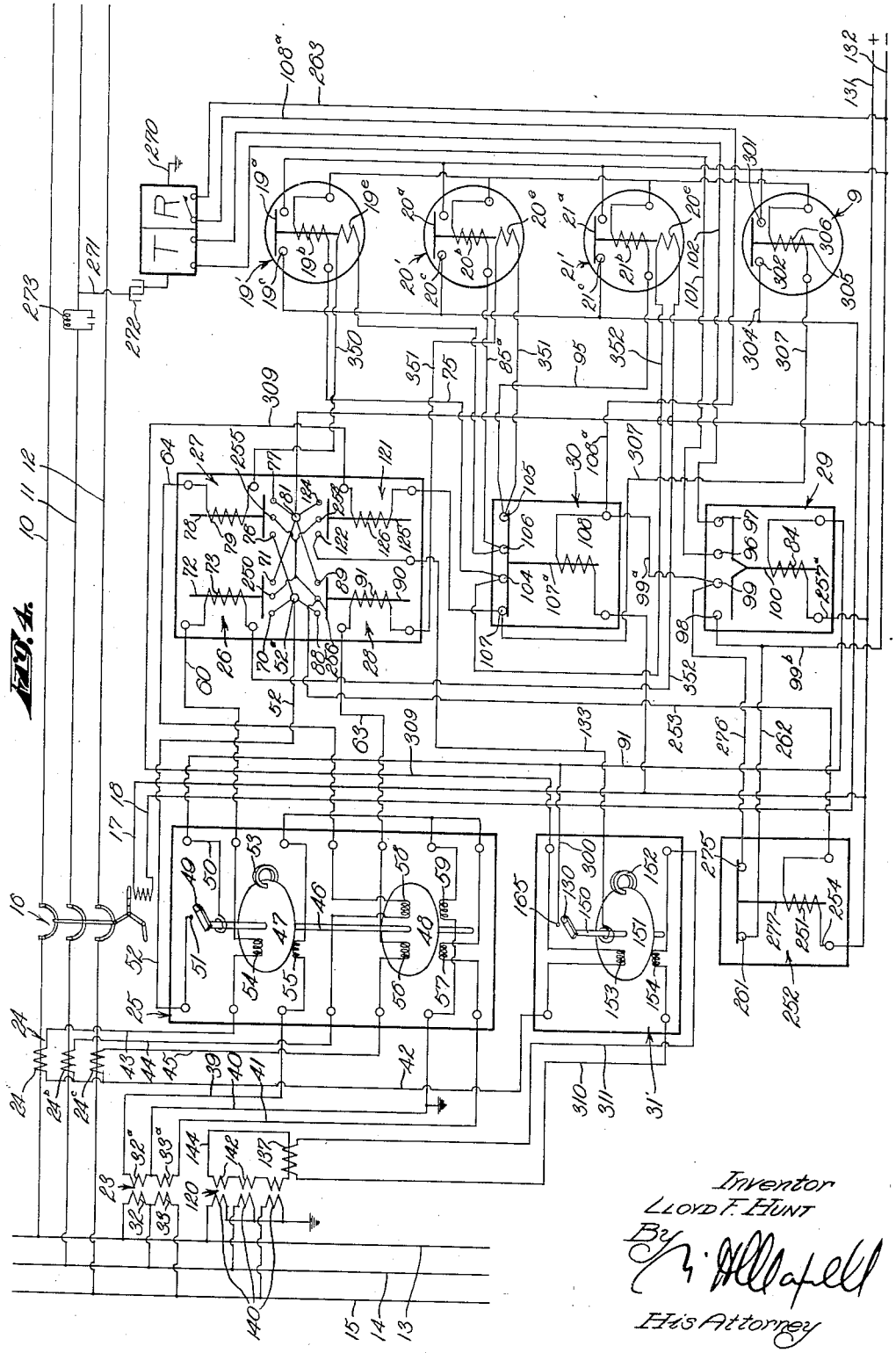
Inventor
Lloyd F. Hunt
By
His Attorney Patented Feb. 21, 1939

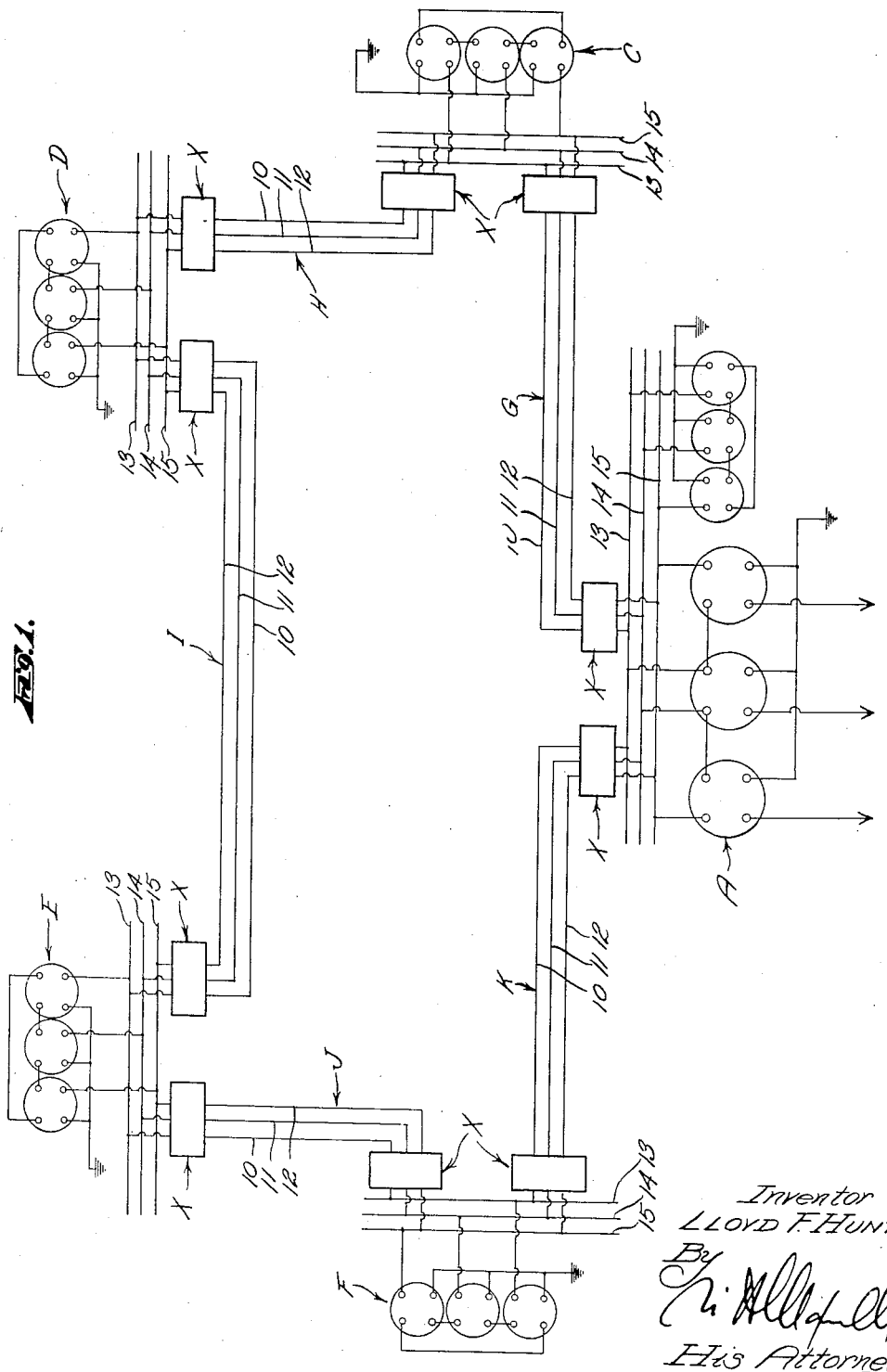

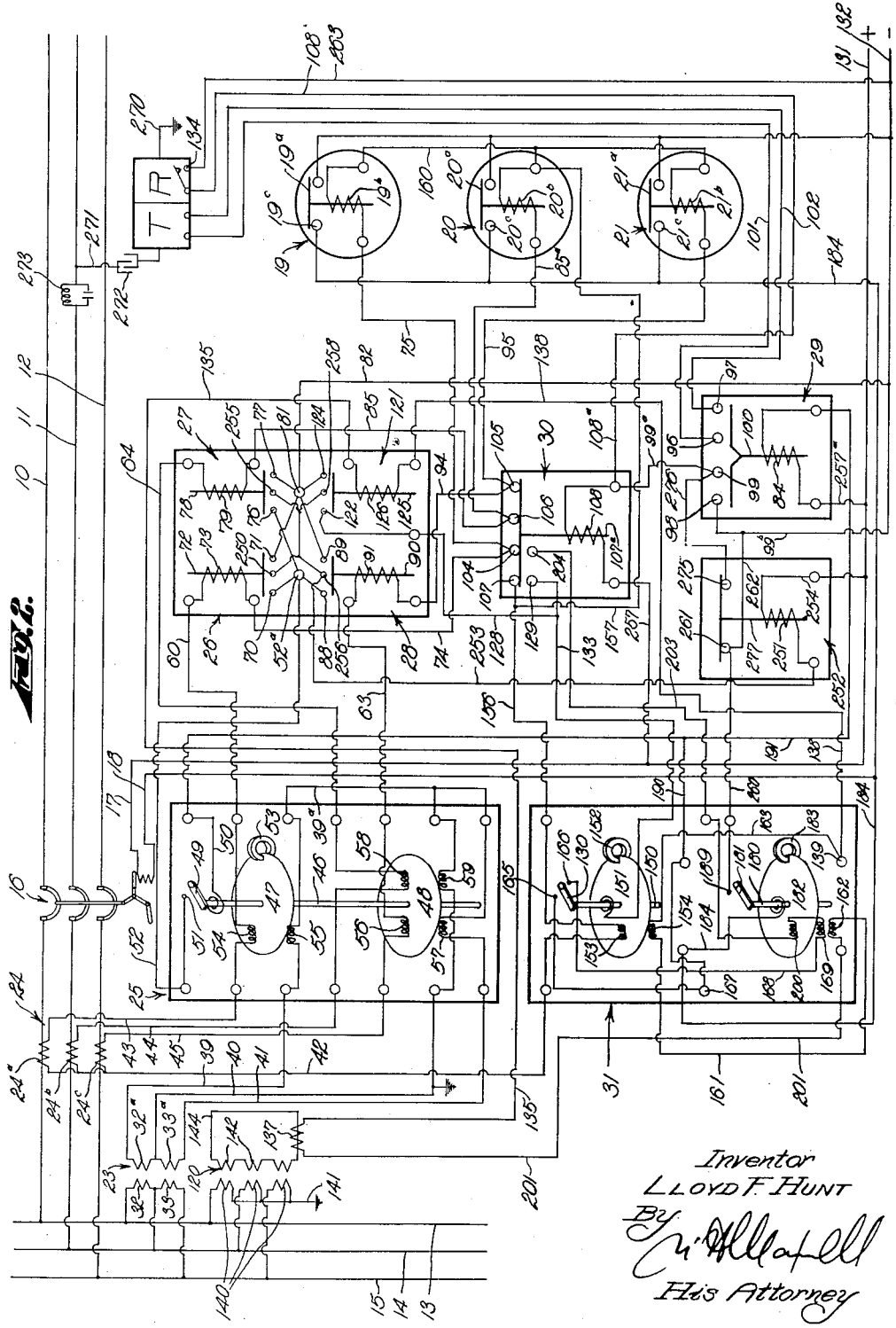

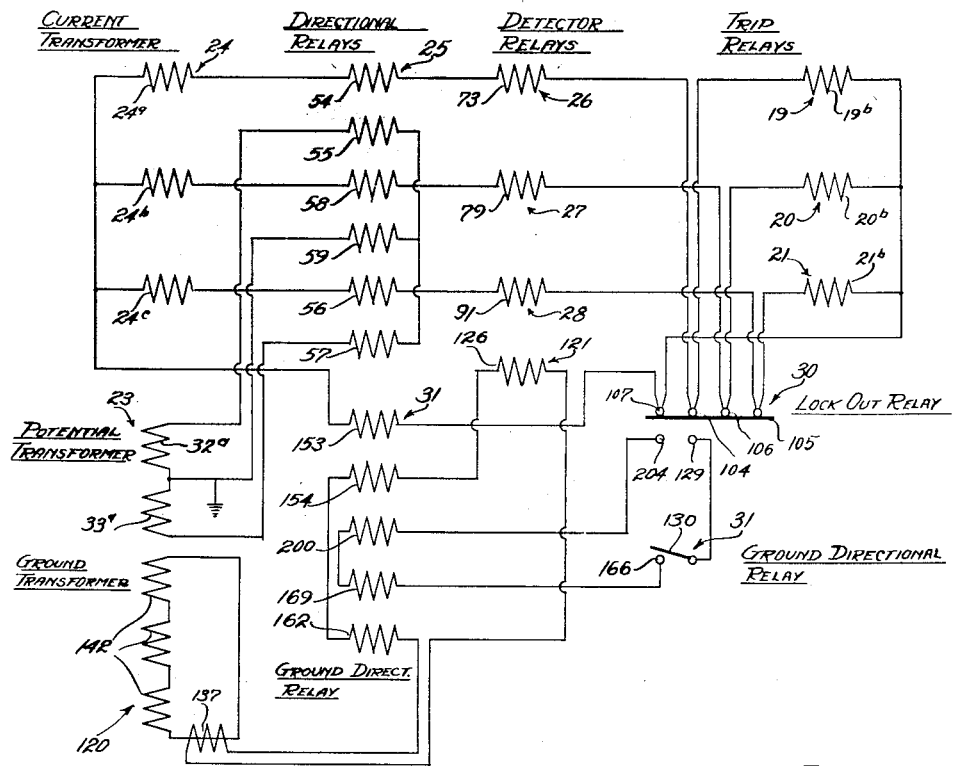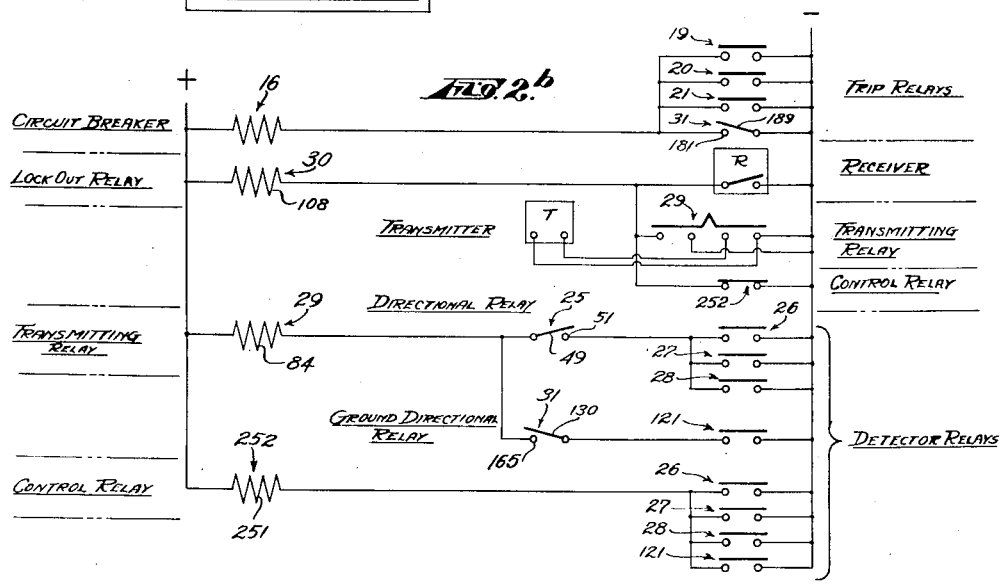

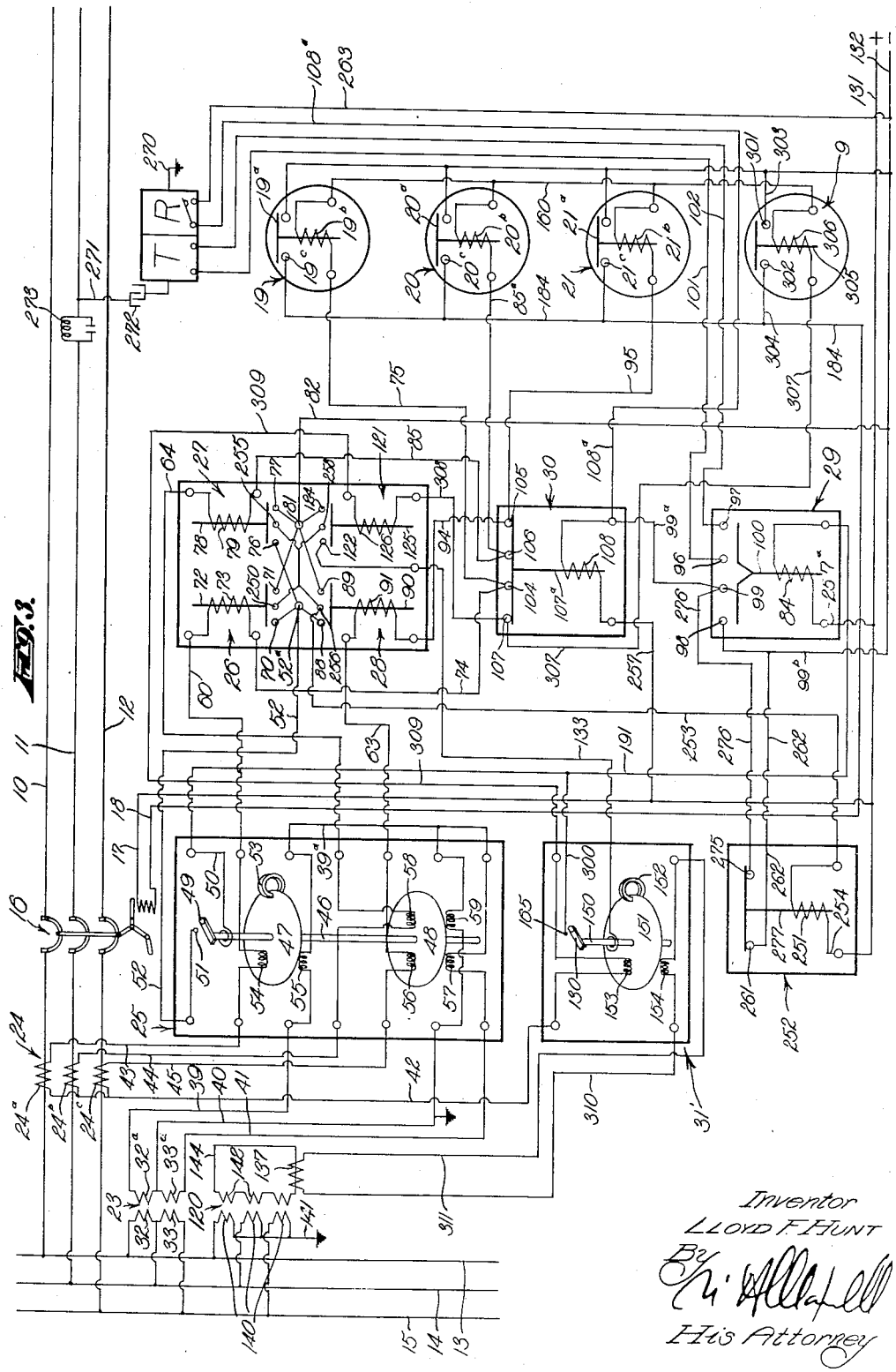

2,147,841

UNITED STATES PATENT OFFICE 2,147,841

PROTECTIVE SYSTEM

Lloyd F. Hunt, Glendale, Calif.

Application November 30, 1936, Serial No. 113,332

7 Claims. (Cl. 175—294)

This invention relates to an electrical protective system and relates more particularly to a protective system for an electrical distributing system. A general object of this invention is to provide an electrical protective system of the character referred to that is highly sensitive to faults in the distributing system and that is very rapid in operation.

Another object of the invention is to provide improvements in a protective system of the general character described in United States Letters Patent No. 2,051,378, issued August 18, 1936.

The present invention is concerned primarily with a system for protecting a power transmission system and the equipment connected therein against fault conditions. Electrical distribution systems of the character referred to may be effectively protected against phase to phase faults by protective equipment of the general type set forth in United States Letters Patent No. 1,940,303 and No. 1,965,896, but considerable difficulty has been encountered in protecting the distribution systems against phase to ground faults. The protective system described and claimed in the above mentioned Patent No. 2,051,378 has proven quite effective in handling phase to ground faults, but difficulty was experienced in coordinating the power directional relays, the overcurrent relays, and the tripping relays to assure the proper operation of the tripping relays. Further, it was found necessary to employ delayed trip relays which, of course, delayed the opening of the circuit breaker.

Another object of this invention is to provide a protective system of the character mentioned in which the elements are so coordinated that there is no possibility of premature operation of the trip relays.

Another object of this invention is to provide a protective system of the character mentioned in which the trip relays may be very rapid and their operation is instantaneous with completion of the operation of the power directional relays and the overcurrent relays.

A further object of the invention is to provide a protective system of the character mentioned embodying a control element or time equalizing means for preventing actuation of the trip relays until the directional relays, the overcurrent relays and the parts associated therewith have completed their operations, whereupon the trip relays are energized so that their actuation may be instantaneous.

The various objects and features of my invention will be fully understood from the following detailed description of typical preferred forms and applications of the invention, throughout which description reference is made to the accompanying drawings, in which:

Fig. 1 is a diagrammatic view of a portion of the electrical distribution system illustrating a power supply station feeding a loop which includes a plurality of line sections connected by sub-stations. Fig. 2 is an enlarged detailed diagrammatic view of one of the units provided by the present invention of the character that is provided at each end of each line. Fig. 2$^a$ is an across the wire diagram of the A. C. circuits shown in Fig. 2. Fig. 2$^b$ is an across the wire diagram of the D. C. circuits shown in Fig. 2. Fig. 3 is a diagrammatic view similar to Fig. 2 illustrating another form of unit of the invention and Fig. 4 is a diagrammatic view similar to Fig. 2 illustrating still another form of unit of the invention.

The typical loop system illustrated in the drawings includes a main station or power station A, a plurality of sub-stations C, D, E and F connected with the supply station A and with one another by lines G, H, I, J and K. The said lines and sub-stations are connected in series and with the main supply station A to constitute a complex system of the loop type.

The protective system of the present invention is associated with the distributing system illustrated in Fig. 1 so that it is operable to cut out a line section in which a fault occurs without disturbing the other line sections of the system. The circuit illustrated is a three phase circuit and each of the lines G, H, I, J and K includes three conductors 10, 11 and 12. The main conductors 10, 11 and 12 of each line extend to and connect with the bus bars 13, 14 and 15 of the stations connected by the lines. The present invention provides a unit X at each end of each line section, the units X being related or interconnected to selectively disconnect a faulted line section whether the fault thereon be a phase to phase fault or a phase to ground fault. A unit X is connected at each end of each of the line sections connecting adjacent stations, whether the stations both be sub-stations or a sub-station and a main station.

The several units X may be identical and I will proceed with a detailed description of one unit X, it being understood that this description is applicable to the other units. The form of unit X illustrated in Fig. 2 of the drawings includes the combination of elements I will now describe in detail. The unit X illustrated in Fig. 2 includes a suitable circuit breaker 16 in the main lines 10, 11 and 12, ahead of the connection of said lines with the bus bars 13, 14 and 15. A source of current independent of the distribution system and carried by lines 17 and 18 is employed to operate the circuit breaker 16. The lines 17 and 18 are connected with power lines 131 and 132, respectively. The line 17 may be directly connected with the power line 131 while the line 18 is indirectly connected with the power line 132, as will be hereinafter described. The circuit for operating the breaker 16 includes a combination of relays which control said circuit and which are governed by the other elements of the unit X. The means for controlling the circuit breaker 16 includes three trip relays or overcurrent phase relays 19, 20 and 21 and a ground relay 31 connected in the breaker operating circuit so that closing of any one of them completes the circuit and effects operation of the breaker. The trip relays 19, 20 and 21 include normally open movable contacts 19a, 20a and 21a, respectively.

Transformers 23 and 24 are associated with the bus bars 13, 14 and 15 and the conductors 10, 11 and 12, respectively, to be energized by the main power circuit. The transformer 23 is a potential transformer and the transformer 24 is a current transformer. The unit X includes a directional relay 25 responsive to the direction of three phase power flow and connected with the transformers and with overcurrent relays 26, 27 and 28. A transmitting relay 29 is under the control of the directional relay 25 or any one of relays 26, 27 or 28 to start the operation of a signal transmitter T and to govern a lockout relay 30. The transmitter T is controlled through contacts 96 and 97 of relay 29 and the coil of the relay 30 is controlled through contacts 98 and 99 of the relay 29. The contacts of the lockout relay 30 are normally closed to cut out the trip relays 19, 20 and 21 by short circuiting the winding of relay 19 through contacts 104 and 107, by short circuiting relay 20 through contacts 106 and 107, by short circuiting the winding of relay 21 through contacts 105 and 107, and hold open the circuit of one of the windings of the ground trip relay 31 at contacts 129 and 204 to normally take the trip relays out of service.

The potential transformer 23 embodies primary windings 32 and 33 connected with the bus bars 13, 14 and 15 and secondary windings 32a and 33a energized by the windings 32 and 33, respectively. The secondary windings 32a and 33a are electrically connected with the directional relay 25 by connections 39, 40 and 41, the connection 40 being grounded.

The above mentioned current transformer 24 embodies secondary windings 24a, 24b and 24c associated with the main power lines 10, 11 and 12, respectively. One pole of each winding 24a, 24b and 24c is connected with a common line 42 which extends to the relay 31 to be hereinafter described. Lines 43, 44 and 45 are connected with the other poles of the windings 24a, 24b and 24c, respectively and extend to the current coils of the relay 25, as will be hereinafter described.

The directional relay 25 embodies a rotatable shaft or unit 46 carrying discs 47 and 48 and a contact 49. The contact 49 is operable to engage a stationary contact 51 connected by a line 52 with a terminal 52a of the group of relays 26, 27 and 28. A line or conductor 50 connects the contact 49 with a line 191 which in turn is connected with one pole of the winding of relay 29. A fixed field element 53 is related to the disc 47 to suitably damp rotation of the unit 46 and the direction of torque on the unit 46 is controlled by windings 54 and 55 suitably associated with the disc 47 and windings 56 and 57, and 58 and 59, related to the disc 48. The windings 54, 56 and 58 are energized by current from the transformer 24 and windings 55, 57 and 59 are energized by current from the transformer 23. As illustrated in Fig. 2, one pole of the winding 54 is connected with the transformer winding 24a by a connection 43 while the other pole of the winding 54 is connected with one terminal of the winding 73 of the relay 26 by a connection 60. The winding 55 has one pole connected with transformer 23 by a line 39 and has its other pole connected by a common connection 39a with a pole of winding 59 and a pole of winding 57. One pole of the winding 56 is connected with the transformer winding 24c by a connection 45 and the other pole of the winding 56 is connected with a terminal of the winding 91 of the relay 28 by a connection 63. One pole of the directional winding 58 is connected with the transformer winding 24b by a connection 44 and the other pole of the winding 58 is connected by a connection 64 with one pole of the winding 79 of relay 27. The winding 59 has one pole connected with the potential transformer 23 by a connection 40 and has its other pole connected with a pole of the winding 55 and a pole of the winding 57 by a common connection 39a. The other pole of the winding 57 is connected with the transformer 23 by a line 41.

The relay 26 is an overcurrent relay comprising stationary contacts 70, 71 and 250, and a movable contact 72 governed by a winding 73. The stationary contact 70 is connected with a terminal 52a which in turn is connected with contact 51 of the relay 25 by a connection 52. The contact 71 is connected with terminal 81 which in turn is connected by line 82 with the power line 132. A conductor or line 74 connects one pole of the relay winding 73 with terminal 104 of the relay 30 and the line 60 connects with the other pole of the winding 73. The terminal 104 is electrically connected with a pole of the winding 19b of relay 19 by a line 75. Contact 250 of relay 26 is connected with one pole of a winding 251 of the relay 252 by a connection 253. The other pole of winding 251 is connected with the power line 131 by a connection 254.

The relay 27 is an overcurrent relay including three stationary contacts 76, 77 and 255, a movable contact 78 and winding 79 controlled by the movable contact 78. The stationary contact 76 is connected with terminal 52a and stationary contact 77 is connected with terminal 81. Winding 79 of relay 27 has one pole connected with the line 64 extending from the relay 25 and has its second pole connected with the terminal 106 of relay 30 by a connection 85. The terminal 106 is connected with a terminal of the winding 20b of relay 20 by a conductor or line 85a. Contact 255 of relay 27 is connected with line 253 which in turn is connected with the winding 251 of relay 252.

The relay 28 is an overcurrent relay embodying stationary contacts 88, 89 and 256, a movable contact 90 and the winding 91 operating the contact 90. Stationary contact 88 is connected with the above described terminal 52a and stationary contact 89 is connected with the above described terminal 81. One pole of the winding 91 of relay 28 is connected with the winding 56 of the relay 25 by a connection 63 and a line 94 connects the other pole of the winding 91 with terminal 105 of relay 30. A line 95 connects the terminal 105 with one terminal of the winding 21$^b$ of relay 21. Stationary contact 256 of relay 28 is connected with line 253 which in turn is connected with the winding 251 of relay 252 as described above.

The transmitting relay 29 embodies four stationary contacts 96, 97, 98 and 99, a movable contact 100 and a winding 84 for operating the movable contact 100. Connections 101 and 102 connect the stationary contacts 96 and 97, respectively, with the signal transmitter T whereby the transmitter is energized upon actuation of the contact 100. Contact 98 is connected with the power line 132 by a connection 99$^b$. Contact 99 is connected with winding 108 of relay 30 by line 99$^a$ and a connection 257 connects the other pole of the winding 108 with line 17 which in turn is connected with power line 131 for completing the circuit between the winding 108 of the relay 30 and the power line 32 when contact 100 is actuated. Winding 84 of relay 29 has one pole connected with line 131 by a connection 257$^a$ and line 91 connects with the other pole of winding 84.

The lock out relay 30 for controlling or locking out the trip relays 19, 20 and 21 includes the stationary contacts 104, 105, 106 and 107 referred to above, stationary contacts 129 and 204, and a movable contact 107$^a$ controlled by winding 108. The winding 108 is normally energized under the control of the relay 252 to hold the movable contact 107$^a$ against the contacts 104, 105, 106 and 107 and out of engagement with contacts 129 and 204. One pole of the winding 108 is connected with contact 99 of relay 29 by line 99$^a$ as described above, and is also connected with a receiver R by a line 108$^a$. The other pole of winding 108 of relay 30 is connected with line 17 as described above.

The protective unit X illustrated in Fig. 2 includes means that is primarily responsive to phase to ground fault conditions. This means includes, generally, a ground transformer 120, the relay 31 mentioned above, and a ground overcurrent relay 121.

The ground overcurrent relay 121 includes three stationary contacts 122, 124 and 258, a movable contact or element 125 for cooperating with the stationary contacts and a coil 126 for controlling the movable element 125. The stationary contact 122 is connected by a conductor 128 with the contact 129 of relay 30 and is connected with the movable contact 130 of relay 31 by line 133. Contact 124 is connected with the terminal 81. The winding 126 has one pole connected by a line 135 with a pole of the transformer winding 137 energized from the transformer 120. The second pole of the winding 126 is connected with the terminal 139 of relay 31 by a line 138. The stationary contact 258 of relay 121 is connected with line 253 which in turn is connected with the winding 251 of the relay 252.

The transformer 120 is connected or associated with the bus bars 13, 14 and 15 and may include three primary windings 140. Each winding 140 has a pole connected with a bus bar and a pole connected with a common ground line 141. The transformer 120 further includes secondary windings 142 connected in series and in a circuit carried by line 144 which energizes the above mentioned winding 137. The relay 31 is associated with the transformer 120 to be responsive to ground current which may result from a fault from one phase of the power circuit to ground and is associated with the current transformer 24 to detect the direction of such a fault. The directional relay 31 includes a movable shaft or element 150 carrying the above mentioned contact 130 and a disc 151 secured to the element 150. A fixed field element 152 is related to the disc 151 to damp rotation of the element 150. Windings 153 and 154 are suitably related to the disc 151 to effect rotation of the disc and element. Winding 153 has a pole connected with the winding of the current transformer 24 by a connection 42. The second pole of the winding 153 is connected by a line 156 with the terminal 107 of relay 30. A line 157 connects the line 156 with one terminal of the winding 20$^b$ of relay 20. The windings of the trip relays 19, 20 and 21 have a common connection 160. A line 161 connects one pole of the winding 154 with one pole of the winding 162 to be hereinafter described. The other pole of winding 154 is connected with the terminal 139 of relay 31 by a connection 163. The movable contact 130 of relay 31 is adapted to turn in one direction to cooperate with the contact 165 and is adapted to turn in the other direction to cooperate with the contact 166. The stationary contact 165 is connected with the terminal 167 of relay 31 which in turn is connected with line 190. Line 190 is connected with line 191 which in turn is connected with one terminal of the winding 84 of the relay 29 and with line 50 of relay 25. The other stationary contact 166 of the relay 31 is connected with one terminal of a winding 169 by a line 168. The movable contact 130 is electrically connected with the stationary contact 129 of relay 30 by a connection 133.

The relay 31 includes a second movable element 180 carrying a contact 181 and a disc 182. Rotation of the disc 182 and the element 180 is damped by a fixed field element 183 suitably related to the disc. The movable contact 181 of the relay 31 is connected with the contacts 19$^c$, 20$^c$ and 21$^c$ of the relays 19, 20 and 21 by a line 184. The relay 31 further includes a stationary contact 189 engageable by the movable contact 181. The stationary contact 189 is connected with a contact 261 of the relay 252 by a line 260. A shunt line 262 connects the line 260 with the line 99$^b$ which in turn is connected with the power line 132 for operating the breaker 16 and with contact 98 of relay 29 and with the receiver R. Line 263 extends from the power line 132 to the terminal 134 of the receiver R. The connection or line 108$^a$ is connected with the other terminal of the receiver. Rotation of the disc 182 is effected by the relationship of the windings 169 and 162 which produces energization of winding 200, the winding 200 being operable to turn the disc. The winding 162 has a pole connected with the transformer winding 137 by a line 201 and has its second pole connected by line 161 with the winding 154 described above. The winding 169 has a pole connected with the contact 166 by a connection 168 and has its second pole connected with a pole of the winding 200. The other pole of the winding 200 is connected with the contact 204 of relay 30 by a line 203.

The relay 252 governs the relay 30, that is, under certain fault conditions the relay 252 de-energizes the relay 30 to allow the trip relays 19, 20 and 21 to function. The relay 252 includes two stationary contacts, the contact 261 and a contact 275. Contact 261 is connected with line 260 and with shunt line 262, as described above. Stationary contact 275 is connected with the contact 99 of relay 29 by a connection 276. Relay 252 further includes a movable contact 277 cooperable with the contacts 261 and 275 and controlled by the winding 251. Winding 251 of the relay 252 is normally de-energized, one pole of the winding being connected with the contacts 250, 255, 256 and 258 of the relays 26, 27, 28 and 121, respectively, by the line 253, and its other pole is connected with the power line 131 by the connection 254. The movable contact 277 normally cooperates with the contacts 261 and 275 so that a circuit is normally completed to the winding 108 of the lockout relay 30. Energization of the winding 251 of relay 252 thus operates to de-energize the lockout relay 30 to allow the trip relays 19, 20 and 21 to function. It will be observed that relay 252 prevents or delays de-energization of the lockout relay 30 until the relays 26, 27, 28 or 121 have functioned to select or set up an energizing circuit for the proper trip relays 19, 20 and 21, whereupon the relay 252 is energized to effect de-energization of the lockout relay 30. The lockout relay 30 is not de-energized until the relay 25 or 31 and a relay 26, 27, 28 or 121 have completed their operations at which time relay 252 de-energizes the relay 30 to allow operation of a trip relay 19, 20, 21 or 31. The trip relays 19, 20, 21 and 31 may, therefore, be instantaneous or very rapid relays. In other words, if the time required for the operation of relays 25 and 29 or the relays 31 and 29 is equal to the time required for the operation of a relay 26, 27, 28 or 121 and the relay 252, the trip relays 19, 20, 21 and 31 may be instantaneous.

Each of the above described units X includes a transmitter T and a receiver R whereby an interconnection is established between the two units X at the ends of each line section. The interconnection between the units may be of any suitable character, for example, it may be a wired connection or may be a wired radio connection carried by the line being protected.

The transmitter T and the receiver R of a given unit X have one pole connected to ground through a ground connection 270 and have their other pole connected with one of the power lines, say the line 11, through a connection 271 having a coupling capacitor 272 and the line 11 may be provided with a radio frequency trap 273 between the line 271 and the busses 13, 14 and 15. The transmitters T and receivers R of the units X at the opposite ends of each line section are connected for cooperation with one another and are isolated from the transmitters and receivers of the other units X whereby a signal sent by one unit of a line section only operates the receiver R at the opposite end of that section.

The relays 25 of all of the units X in the system are of the type known in the art as power directional relays. The relays 25 of the several units X are such that when the direction of power current flow is toward the bus of a unit X the torque on the discs 47 and 48 of its relay 25 causes its contacts 49 and 51 to be in a closed condition. When the power current flow is away from the bus of a unit X the torque on the discs 47 and 48 of its relay 25 causes the contacts 49 and 51 to be open. Referring to Fig. 1 of the drawings the normal flow of power is from the station A to the sub-station C, over the line section G so that the power flow at the unit X of the station A at the end of said section is away from its bus and the relay 25 of the unit has its contacts 49 and 51 open and the power flow at the unit X of the line section G located at the sub-station C is toward its bus so that the contacts of the relay 25 of the unit X are closed. The relays 25 are responsive to normal load current flow but in the event of a short circuit condition the short circuit current is greater than the normal load current and the relay 25 is responsive to the short circuit. Thus the relays 25 are controlled by the short circuit current when a fault condition exists.

In the event that a phase to phase short circuit occurs in a line section, for example in the line section I between stations E and D on the lines 10 and 11 the current transformers 24ª and 24ᵇ at each end of the said section are energized causing the units X at both ends of the section to function. The functioning of a unit X under such circumstances is as follows. The current transformer 24 is electrically connected with the operating windings of the relay 25 in the manner described above to effect operation of the relay 25 to open its normally closed contacts 49 and 51 or to close its normally open contacts 49 and 51 depending upon whether the normal power current flow in the associated line section is toward or away from the bus of the unit X. The windings of relays 26, 27 and 28 are connected in series with the windings of the relay 25 by the connections described above so that certain of the relays 26, 27 and 28 are operated to condition or set up circuits for energizing their related trip relays 19, 20 and 21. Energization of a relay 26, 27 or 28 also effects energization of the relay 252 which in turn de-energizes the lock-out relay 30. It is to be understood that the lock-out relay 30 remains energized to prevent actuation of the trip relays 19, 20 and 21 until energization of the relay 252. When the lock-out relay 30 is de-energized by the above described action of the relay 252 the trip relay 19 and/or trip relay 20 and/or trip relay 21 operates. The relays 19, 20 and 21 are associated with the energizing means of the circuit breaker 16 so that the breaker is tripped or operated when a relay 19, 20 or 21 is energized. In practice a phase to phase fault in a line section results in the energization of one or more of the relays 19, 20 or 21 through the relays 25, 26, 27 and/or 28 and under the coordinating control of the relays 252 and 30 due to the fact that the contact 49 of relay 25 is not in engagement with contact 51.

When a phase to phase short occurs in a line section external to the line section of the system being protected by the units X under consideration, the direction of the current from the transformer 24 is reversed in the relays of the units X so that the contact 49 of the relay 25 of each unit X engages its related contact 51. Such a phase to phase short circuit results in energization of one or more of the relays 26, 27 and 28 to close their contacts which in turn causes the terminals 52ª and 81 of the relays to be electrically connected. Engagement of the contact 49 with the contact 51 completes the circuit to the relay 29 through the connections 50, 191, 132, 257 and 131, described above. The resultant energization of relay 29 engages contacts 96 and 97 which control the operation of the transmitter T. When the transmitter T is thus put into operation it sends a signal over the line to the receiver R at the other end of the line. The above described operation of relay 29 also prevents de-energization of the lock-out relay 30 by completing and maintaining an energizing circuit to the relay 30 through the closing of contacts 98 and 99. So long as the energization of the lockout relay 30 is maintained it cuts out the windings of relays 19, 20 and 21 and thus prevents the system from operating to trip the breaker.

When a phase to phase fault occurs on a line of the system the units X at the ends of that line operate so that their breakers 16 open. On the other hand, when a fault occurs in a line as a result of a fault on another line of the system the unit X receiving such current flow cuts out or becomes locked so that its breaker cannot function and sends a signal which is carried by its line to the unit X at the other end of said line, which signal effects the locking out of the last mentioned unit X so that its breaker 16 does not function.

The magnitude of current flow resulting from a phase to ground fault on a line is not ordinarily sufficient to operate the relays 25, 26, 27, 28, 19, 20 and 21, as described above, but may be sufficient when aided by the current from the ground transformer 120 to operate the directional element 150 of the relay 31. A phase to ground fault results in current flow in the relay 31 of the unit X at the end of the line to close the contacts 130 and 166 to effect energization of the winding 200 of the relay 31. Winding 200 is energized through induction from the winding 162 to winding 169. This energization of winding 200 results in closing of the contacts 181 and 189 to complete a circuit through the connections 132, 99$^b$, 262, 260, 184, 18, 17 and 131 to trip the breaker 16.

In the event of a phase to ground fault on the bus side of the unit X relay 31 operates as just described except that current flow in the winding 153 is reversed to move contact 130 into engagement with contact 165. Relay 121 is energized from transformer 137 through line 201, winding 162, line 161, winding 154, line 163, line 138 and line 135. Closing of contact 130 with contact 165 completes the circuit to the relay 29 through contacts 122 and 124 of energized relay 121. Contacts 96 and 97 of relay 29 close to complete the circuit to the transmitter T which sends a signal to the unit X at the other end of the line section to lock it out as above described. Under the fault condition just mentioned contact 130 of relay 31 is out of engagement with contact 166 so that winding 200 is not energized and contacts 181 and 189 of relay 31 do not close and the breaker 16 cannot trip.

The circuit connections will now be more specifically traced under typical fault conditions.

*Phase to phase internal fault in a line section*

When a phase to phase short circuit occurs in a line section, for example, in the line section I between the sub-stations E and D and on the lines 10 and 11 the current transformers 24$^a$ and 24$^b$ at each end of said section are energized. The operation of a unit X under such circumstances is as follows. The current transformer 24$^a$ of the unit X is energized by the fault current in line 10 and the transformer 24$^b$ is energized by fault current in the line 11, the current flow in the transformers being in opposite directions. The secondary current of the transformer 24$^a$ is carried by the conductor 43 to the coil 54 of relay 25 and from relay 25 to the coil 73 of relay 26 by conductor 60 and from the relay 26 to the contact 104 of relay 30 by conductor 74. Since relay 30 is normally energized the current flows from contact 104 to contact 106 and thence by line 85 to coil 79 of relay 27, from relay 27 by line 64 to the coil 58 of relay 25 and then from relay 25 by line 44 to the current transformer 24$^b$, the circuit being completed by the tie between the transformers 24$^b$ and 24$^a$. The current flow through the coil 73 of relay 26 causes contacts 70, 250 and 71 to be made and current in the coil 79 of relay 27 causes contacts 76, 255 and 77 to be made. Current flows from power line 132 through line 82 to the contact 255 and from contact 71 to contact 250 and then by line 253 to the coil 251 of relay 252 and then from the relay 252 to the power line 131 by the conductor 254, thus completing the circuit and actuating the relay 252. Actuation of relay 252 causes contacts 261 and 275 to open, breaking the circuit to the coil 108 of relay 30 which was normally established from power line 132 through line 99$^b$, contacts 261 and 275, lines 276 and 99$^a$, coil 108 of relay 30 and the line 257 to the power line 131. De-energization of relay 30 allows the current carried by line 74 to contact 104 to pass through the line 75 to coil 19$^b$ of the trip relay 19, from relay 19 by line 160 to coil 20$^b$ of trip relay 20 and from relay 20 by line 85$^a$ to contact 106 of relay 30 and from relay 30 by line 85 as previously described. Energization of relay 19 closes contacts 19$^a$ and 19$^c$ and energization of relay 20 causes contacts 20$^a$ and 20$^c$ to close. This completes the circuit from the power line 132 through these contacts to the line 184, through line 18 to the trip coil of the circuit breaker 16 and from the circuit breaker coil by line 17 back to the power line 131 to complete the breaker circuit. The units X at the opposite ends of the line section I having operated as just described clear the faulted line section I.

*Phase to ground fault internal of a line section*

In the event of an internal ground fault from the line 10 to the ground in line section I the units X at the opposite ends of the section operate in the same manner and as follows. Fault current in line 10 energizes current transformer 24$^a$ and current from the transformer flows over line 43 through coil 54 of relay 25, from relay 25 over line 60 through coil 73 of relay 26, from relay 26 through line 74 to the contact 104 of relay 30 and to contact 107, and from relay 30 by line 156 to coil 153 of relay 31, and from relay 31 by line 42 to the transformer 24$^a$, completing the circuit. The ground fault current returning from the power line 10, is carried by line 141 of the ground bank 140, causing current to flow in the circuit of line 144 and through the transformers secondary 142, thus energizing the current transformer 137. Current flows from the secondary of transformer 137 by line 135, through coil 126 of relay 121, and from relay 121 by line 138 to coil 154 and coil 162 of relay 31, and from relay 31 by line 201 to the secondary of transformer 137 to complete the circuit. The torque on the disc 151 produced by the energized coils 153 and 154 causes the contacts 130 and 166 to close. Current in the coil 126 of relay 121 closes contacts 124, 258 and 122. Power from line 132 flows through line 82 and contacts 124 and 258 of relay 121, through line 253 to coil 251 of the relay 252, then through line 254, back to power line 131 to complete the circuit. Actuation of relay 252 opens contacts 261 and 275 to break the energizing circuit of the relay 30. De-energization of relay 30 closes contacts 129 and 204. Coil 162 of relay 31 energized by the circuit just described causes coil 169 to be energized by induction so that current flows from the coil 169 over line 168 through closed contacts 166 and 130, over line 133 through closed contacts 129 and 204 through line 203 through coil 200 and the tie between coil 200 and coil 169 to complete the circuit. Torque produced by the coils 200 and 162 causes the disc 182 to turn and closes the contacts 181 and 189. Current from line 132 carried by lines 99$^b$ and 260, closed contacts 189 and 181 of relay 31 flows from relay 31 through lines 184 and 18 to the coil of the breaker 16, and then passes by line 17 to the power line 131 to complete the breaker circuit. Tripping of the circuit breakers 16 of the units X at the ends of the affected line section I clears the line section.

*Phase to ground fault external of a line section*

In the event of a phase to ground fault external of a line section, say the section J, the operation of the protective unit X at the station E on the line section I is as follows. Under this condition the current transformer 24$^a$ of the said unit X is energized by current flow in a direction opposite to the direction of flow when there is a phase to ground fault external of the section. The secondary current from the transformer 24$^a$ flows on line 42 to coil 153 of relay 31 and from relay 31 over line 156 to contact 107, thence to contact 104 of energized relay 30, then over line 74 to coil 73 of relay 26, from relay 26 over line 60 to the coil 54 of relay 25, and then from relay 25 over line 43 to the current transformer 24$^a$ to complete the circuit. The ground fault current returning from line 10 is carried by line 141 of the ground bank 140, causing current to flow through line 144, through the secondary 142 of the transformer 140, thus energizing the current transformer 137. Current flows from the secondary of transformer 137, by line 135 through coil 126 of relay 121 and thence by line 138 to the coil 154 and the coil 162 of relay 31 and then by line 201 to the secondary of transformer 137, completing the circuit. Torque produced by the coils 153 and 154 on the disc 151 causes the disc to turn to close contacts 130 and 165. Current in the coil 126 of relay 121 brings about the closing of contacts 124, 258 and 122. Power from line 132 flows through line 82, closed contacts 124 and 122 of relay 121, through line 128, through closed contacts 130 and 165 of relay 131, through lines 190 and 191 to the coil 83 of relay 29 and then through line 257$^a$ to the power line 131 to complete the circuit and energizing relay 29. Energization of relay 29 closes contacts 98 and 99 and 96 and 97. Current flows from line 132 through line 82 to closed contacts 124 and 258 of relay 121, then through line 253 to the coil 251 of relay 252 and from the relay 252 to the power line 131 through line 254, completing the circuit. This operates relay 252 so that its contacts 261 and 275 are opened, but does not effect the de-energization of relay 30 because a circuit remains completed through line 132 and line 99$^b$ to closed contacts 98 and 99 of relay 129, from relay 129 by line 99$^a$ to the coil 108 of relay 30 and from relay 30 to the power line 131 by way of line 257. When relay 30 remains energized the contacts 129 and 204 are open so that the circuit through coils 200 and 169 at the disc 182 of relay 31 remain de-energized. Thus the tripping means or tripping part of relay 31 does not operate to cause tripping of the breaker 16. Energization of relay 29 as just described completes a circuit to the transmitter T, through lines 101 and 102 and contacts 96 and 97. The transmitter T sends a signal through condenser 272, line 271 and line 11 of the section I to the line 271 at the unit X at the sub-station D, and through the condenser 272 to the receiver R of the unit X at the sub-station D. This signal closes switch or contact 134 of the receiver R of the unit X just mentioned. The current from power line 132 flows through line 263 to the contacts 134, then over line 108$^a$ to the coil 108 of relay 30, and from relay 30 over the line 257 to the power line 131 to complete the circuit through the lock-out relay 30. This energization of the lock-out relay 30 prevents actuation of the trip relays 19 and 20 so that the breaker 16 of the unit X at the sub-station D is not tripped. Thus the circuit breaker 16 of the units X at the opposite ends of the section I are prevented from operating when a phase to ground fault occurs on the line section J.

*Phase to phase fault external of a line section*

Referring again to Fig. 1 and considering the operation of the protective units at the ends of the line section I when there is a short circuit on the lines 10 and 11 of the line section J the operation of the unit X at the station E on the line section I is as follows. Under a condition of this character current flow in the lines 10 and 11 of the unit X at the station E on the section I energizes the current transformers 24$^a$ and 24$^b$ to cause current to flow from the transformer 24$^b$ on the line 44, through coil 58 of relay 25, from relay 25 through line 64 to the coil 79 of relay 27, and from relay 27 by line 85 to the contact 106 of relay 30 and from contact 106 to contact 104, then by line 74 to coil 73 of relay 26 and from relay 26 by line 60 to coil 54 of relay 25 and from relay 25 by line 43 to current transformer 24$^a$, the tie between the transformers 24$^a$ and 24$^b$ completing the circuit. The torque produced by energized coils 54 and 55 on disc 47 of relay 25 and the torque produced by energized coils 58 and 59 on disc 48 of relay 25 closes contacts 49 and 51. The current in coil 73 of relay 26 actuates the relay to close contacts 70, 250 and 71, and current in the coil 79 of relay 27 actuates the relay to close the contacts 76, 255 and 77. From power line 132 current flows through line 82 to contacts 77 and 71, from contacts 76 and 70 through line 52 to closed contacts 51 and 49, then through line 191 to coil 84 of relay 29, from relay 29 by line 257$^a$ to power line 131, completing the circuit. This energization of coil 84 closes contacts 98 and 99 and contacts 96 and 97. Current flows from power line 132 through line 82 to contacts 77 and 71, thence to contacts 255 and 250, respectively, and by line 253 through coil 251 of relay 252 and then from a relay 252 through line 254 to the power line 131, completing the circuit. Energized relay 252 opens contacts 261 and 275, but as relay 29 is operative at this time the circuit to the coil of relay 30 remains closed from power line 132 through line 99$^b$, contact 98 of relay 29, contact 99, line 99$^a$, and the coil 108 of relay 30 and from the coil 30 by line 257 to the power line 131. As the relay 30 prevents current flow to the trip relays 19 and 20, these relays remain inactive and the breaker 16 is not tripped. Energization of relay 29 completes a circuit to the transmitter T through lines 101 and 102 by the contacts 96 and 97. Transmitter T sends a signal through condenser 272 and line 271, over power line 11 of the section I to the line 271 and condenser 272 of the unit X at the sub-station D, delivering a signal to the receiver R. This signal closes contact 134 of the unit X at sub-station D. This causes current to flow through line 263 from power line 132 and through contacts 134 and over the line 108ª to the coil 108 of relay 30. The current continues from relay 30 through line 257 to the power line 131 to complete the circuit through the relay 30. This energization of relay 30 prevents actuation of the trip relays 19 and 20 so that the breaker 16 of the unit X at the sub-station D is not tripped. Thus the breakers 16 of the units X at both ends of the section U are prevented from being tripped by a phase to phase fault condition external of the line section.

Fig. 3 of the drawings illustrates a form of unit X' adapted to be employed in the protective system in the same manner as the above described unit X. The unit X' illustrated in Fig. 3 is similar to the type of protective unit described in the above-mentioned Patent No. 1,940,303, differing therefrom in that it includes means for so co-ordinating the operations of the various elements that the trip relays may be very rapid or instantaneous relays. The unit X' is similar to the unit X described above, differing therefrom in that it embodies a trip relay 9 replacing the above-described trip relay elements of the relay 31.

The ground directional relay 31' of the unit X' embodies the rotatable element 150 carrying the disc 151 and the contact 130. The contact 130 is adapted to engage the contact 165. The fixed field element 152 dampens rotation of the disc 151 and the element 150. The windings 153 and 154 of the relay 31 are related to the disc 151 to effect rotation of the disc and the element 150. Line 42 connects one pole of the winding 153 with the current transformer 24. The other pole of winding 153 is connected with one pole of the winding 126 of relay 121 by a line 309. A line 310 connects one pole of the winding 154 with the transformer winding 137 and a line 311 connects the other pole of the winding 154 with the other pole of winding 137. The stationary contact 165 of relay 31 is connected in line 191 by a line 300. Line 133 connects the movable contact 130 with the stationary contact 122 of relay 121. It will be noted that contacts 129 and 204 of relay 30 are eliminated in the unit X'.

Trip relay 9 is operable under certain ground fault conditions to trip the circuit breaker 16. Relay 9 includes two stationary contacts 301 and 302. A line 303 connects contact 301 with the common line 160 of the trip relays 19, 20 and 21. Line 304 connects the stationary contact 302 with line 184. The trip relay 9 further includes a movable contact 305 operated by a coil 306. Common line 160 is connected with one pole of the relay coil 306. A line 307 connects the other pole of winding 306 with the contact 107 of the lock-out relay 30. A line 308 connects one terminal of the winding 126 of relay 121 with the contact 107 and, therefore, with line 307 extending to the winding 306 of relay 9. The unit X' illustrated in Fig. 3 is otherwise identical with the above-described unit X and the corresponding reference numerals are employed on corresponding elements of the two units.

The action or operation of the unit X' in the case of a phase to phase fault is the same as that of the above-described unit X. In the event of a phase to ground fault in the line section protected by the unit X' the relay 25 is energized to close its contacts 49 and 51 but the magnitude of the current delivered to the coils of relays 26, 27 and 28 may be insufficient to operate the relays. Under the phase to ground fault conditions just referred to where the ground fault current is flowing toward the unit X' from an adjacent line section, current flow in the winding 153 of relay 31' moves the contact 130 into engagement with contact 165. This energizes the winding 84 of relay 29 through lines 300, 191 and 257ª. Relay 29 energizes the transmitter T to send a signal to the unit X' at the adjacent line section to hold it in service. Simultaneous with the energization of relay 31' winding 126 of relay 121 is energized through line 309 to close contacts 125 and 258. This completes the energizing circuit to coil 251 of relay 252 through line 253. Energization of relay 252 breaks the circuit to the coil 108 of lock-out relay 30. Thus trip relay 9 is allowed or conditioned to operate by current received through lines 307 and 308. The relay 9 completes a circuit to operate the breaker 16 as will be readily understood. It will be noted that relay 252 normally conditions the lock-out relay 30 and that energization of relay 252 immediately following operation of relay 121 de-energizes the relay 30 so that the trip relay 9 may be very rapid or instantaneous. Trip relay 9 is not conditioned until relay 121 has completed its operation, the relay 252 serving to sustain relay 30 until relay 121 is fully operated. Thus the provision of the relay 252 allows the trip relay 9, as well as the trip relays 19, 20 and 21, to be very rapid or instantaneous relays.

Fig. 4 of the drawings illustrates a protective unit X² similar to the above-described unit X' and differing therefrom in that it embodies balanced current trip relays 19', 20', 21' so related that the unit is not responsive to balanced three phase faults or balanced over-current conditions resulting from out of step conditions in the system but will properly select and clear the line section involved in any other type of fault. Corresponding reference numerals are applied to corresponding elements in Figs. 2, 3 and 4.

The trip relay 19' includes the operating coil 19ᵇ, the trip relay 20' includes the operating coil 20ᵇ and the trip relay 21' includes the operating coil 21ᵇ all of which are connected and energized in the same manner as in the above-described protective units X and X'. The trip relay 19' further includes a balancing coil or restraining coil 19ᵉ. Coil 19ᵉ is connected in the relay system so that under normal operation, current from another phase flows through it so that the phase relation of the current in the coils 19ᵉ and 19ᵇ is 120° apart in a Y relationship, so that the coil 19ᵉ is operable to restrain or prevent closing of the contact 19ª. The restraining coil 19ᵉ is interposed in line 350 which connects one pole of the winding 79 with the contact 106 of the lock-out relay 30. The contact 106 is connected with the operating coil 20ᵇ of trip relay 20' by line 85ª. The restraining coil 19ᵇ is thus energized simultaneously with the operating coil 20ᵇ of trip relay 21'. The coil 20ᵇ is associated with the overcurrent relay 28. Restraining coil 20ᵉ of trip relay 20 is interposed in a line 351 which connects one pole of the winding 91 with the contact 105 of relay 30. Line 95 connects said contact 105 with one pole of the operating winding 21ᵇ of relay 21'. Current flowing through the restraining coil 20ᵉ is from a different phase than current in the operating coil 20ᵇ. The phase relationship of current in the two coils 120° apart in a Y formation is such that the coil 20ᵉ is operable to restrain or prevent operation of the contact 20ᵃ when both coils are energized. The restraining coil 21ᵉ of relay 21' is interposed in line 352 which connects one pole of the winding 73 of relay 26 with the contact 104 of relay 30. The line 75 connects contact 104 with one pole of the operating coil 19ᵇ of relay 19'. The current supplied to the coils 21ᵇ and 21ᶜ is from different phases 120° apart in a Y relationship.

The operation of the unit X² illustrated in Fig. 4 is substantially the same as that of the above described unit X' except that the unit X² is not responsive to a balanced three phase fault and is not affected by or responsive to an out of step condition in the system resulting in a reactance center in the line section protected by the unit. The unit X² is intended primarily for use in a protective system for protecting a distribution system having two or more synchronous generators or synchronous machines and may be employed in a system of the character described in Patent No. 1,965,896. The unit X² embodying the above-described restraining coils 19ᵉ, 20ᵉ and 21ᵉ of the trip relays 19', 20' and 21', respectively, is not responsive to or sensitive to line instability of a reactance center resulting from an out of step condition, but is responsive to every other kind of fault condition except balanced three-phase faults which are very rare. The unit X² operates under a phase to ground fault in the same manner as the unit X'. In the event of a phase to phase fault, current from one phase or line 10, 11 or 12 flows through the operating coil 19ᵇ, 20ᵇ or 21ᵇ of a trip relay 19', 20' or 21' after passage through the coil of a relay 26, 27 or 28, to close or operate the contact 19ᵃ, 20ᵃ or 21ᵃ of the related trip relay. The contacts 19ᵃ, 20ᵃ and 21ᵃ of the trip relays are normally open and the above-described current flow through the energized coil 19ᵇ, 20ᵇ or 21ᵇ is such that the torque is opposite to that in the restraining coils 19ᵉ, 20ᵉ and 21ᵉ. When an operating coil 19ᵇ, 20ᵇ or 21ᵇ is energized by an overcurrent, as just described, the restraining coil 19ᵉ, 20ᵉ or 21ᵉ of another relay 19', 20' or 21' is simultaneously energized. It is to be understood that the trip relays 19', 20' and 21', as well as the trip relay 9, are under the control of the lock-out relay 30 which in turn is under the control of the relay 252. Relay 252 prevents de-energization of the lock-out relay 30 and so long as relay 30 remains energized it short circuits the operating coils of the trip relays 19', 20' and 21' to normally prevent their operation. The operation or energization of the relay 252 follows the operation of the relays 26, 27 and/or 28 so that the lock-out relay 30 is not de-energized until completion of the operation of the relays 26, 27 and/or 28. Accordingly, the trip relays 19', 20' and 21' and the relay 9 may be instantaneous with the de-energization of the lock-out relay 30 and the trip relays may be very rapid or instantaneous relays.

Having described only typical preferred forms and applications of my invention, I do not wish to be limited or restricted to the details herein set forth, but wish to reserve to myself any variations or modifications that may appear to those skilled in the art or fall within the scope of the following claims.

Having described my invention, I claim:

1. In a protective system for a sectional electrical distribution system, a protective unit for one end of one line section of the system, comprising, a circuit breaker controlling said section, the circuit breaker having a trip coil, an energizing circuit for the trip coil of the breaker, a current transformer associated with said section, a trip relay controlling said circuit and operable to effect the energization of the trip coil of the circuit breaker and adapted to be operated by current from the current transformer, a lock-out relay normally preventing actuation of the trip relay, an overload relay energized by current from the current transformer, and a control relay governed by the overload relay operable to condition the lock-out relay to permit operation of the trip relay following energization of the overload relay.

2. In a protective system for a sectional electrical distribution system, a protective unit for one end of one line section of the system, comprising, a circuit breaker controlling said section the circuit breaker having a trip coil, an energizing circuit for the trip coil of the breaker, a current transformer associated with said section, a trip relay controlling said circuit and operable to effect the energization of the trip coil of the breaker and adapted to be operated by current from the current transformer, a lock-out relay normally preventing actuation of the trip relay, an overload relay energized by current from the current transformer, a signal transmitter, a signal transmitting relay controlled by the overload relay to initiate operation of the signal transmitter, and a control relay governed by the overload relay operable to condition the lock-out relay to permit operation of the trip relay following energization of the overload relay.

3. In a protective system for a sectional electrical distribution system, a protective unit for one end of one line section of the system, comprising, a circuit breaker controlling said section, the circuit breaker including a trip coil, an energizing circuit for the trip coil of the breaker, a current transformer associated with said section, a trip relay controlling said circuit and operable to effect the energization of the trip coil of the breaker and adapted to be operated by current from the current transformer, a lock-out relay normally preventing actuation of the trip relay, a ground transformer connected with the line, an overload relay to be energized by current from the ground transformer, and a control relay governed by the overload relay and operable upon energization of the overload relay to condition the lock-out relay to permit operation of the trip relay following operation of the overload relay.

4. In a protective system for a sectional electrical distribution system, a protective unit for one end of one line section of the system, comprising, a circuit breaker controlling said section, the circuit breaker including a trip coil, an energizing circuit for the trip coil of the breaker, a current transformer associated with said section, a trip relay controlling said circuit and operable to effect the energization of the trip coil of the breaker and adapted to be operated by current from the current transformer, a ground transformer connected with said line section, a trip relay controlling said circuit operable to effect the energization of the breaker and adapted to be operated by residual current from the line section upon residual current flow in a single direction in said section, a lock-out relay normally locking out the said trip relays, a phase overload relay to be energized by current from the current transformer, a ground overcurrent relay to be energized by said residual current, and a control relay governed by either of the said overload relays and operable to condition the lock-out relay to allow operation of a trip relay following operation of one or both of said overload relays.

5. In a protective system for a sectional polyphase electrical system, a protective unit for one end of each section of the system comprising, a circuit breaker controlling said section of the line, the circuit breaker including a trip coil, an energizing circuit for the trip coil of the breaker, a current transformer associated with said section, balanced trip relays controlling said circuit and operable to effect energization of the trip coil of the breaker and operable by current from the transformer only when there is an unbalanced phase fault in the said line section, a lock-out relay normally locking said trip relays, an overload relay energized by current from the transformer, and a control relay governed by the overload relay operable to condition the lock-out relay to permit operation of the trip relays following operation of the overload relay.

6. A protective system for a sectional multiphase power line including, protective units at the ends of each section of the line, each unit including, a circuit breaker controlling the line section, the breaker including a trip coil, an energizing circuit for the trip coil, a plurality of trip relays controlling the said circuit and operable to effect energization to the trip coil, means operatively connecting the phases of the line section and the trip relays to supply fault current to the trip relays to operate the same, normally energized lock-out means preventing operation of the trip relays, and means associated with the first mentioned means to de-energize the lock-out means.

7. A protective system for a sectional multiphase power line including, protective units at the ends of each section of the line, each unit including, a circuit breaker controlling the line section, the breaker including a trip coil, an energizing circuit for the trip coil of the breaker, a plurality of trip relays controlling the said circuit and operable to effect energization of the trip coil, means operatively connecting the phases of the line section and the trip relays to supply fault current to the trip relays to operate the same, normally energized lock-out means preventing operation of the trip relays, and a control relay energized by the first mentioned means for de-energizing the lock-out relay.

LLOYD F. HUNT.